United States Patent

Casas

[11] Patent Number: 5,918,565
[45] Date of Patent: Jul. 6, 1999

[54] FLAG AND PAINT MARKING DEVICE

[76] Inventor: Jose G. Casas, 1424 Adelman, Joliet, Ill. 60435

[21] Appl. No.: 08/932,317

[22] Filed: Sep. 17, 1997

[51] Int. Cl.$^6$ .................................. B67D 5/64; G08B 1/00
[52] U.S. Cl. ........................ 116/211; 116/209; 222/174; 222/192
[58] Field of Search .................... 116/209, 211; 222/174; 239/150, 156, 722

[56] References Cited

U.S. PATENT DOCUMENTS

| | | | |
|---|---|---|---|
| 2,317,288 | 4/1943 | McCubbin | 239/150 |
| 2,633,382 | 3/1953 | Dudley et al. | 222/174 |
| 3,485,206 | 12/1969 | Smrt | 222/174 |
| 3,700,144 | 10/1972 | Smrt | 222/176 |
| 3,977,570 | 8/1976 | Smrt | 222/174 |
| 4,050,404 | 9/1977 | McMackin | 116/209 |
| 4,099,482 | 7/1978 | Smrt | 222/174 X |
| 4,262,821 | 4/1981 | Smrt | 222/174 X |
| 4,943,008 | 7/1990 | Smrt | 239/150 X |
| 5,368,202 | 11/1994 | Smrt | 222/174 |
| 5,769,279 | 6/1998 | Smrt | 222/174 |

*Primary Examiner*—Richard Chilcot
*Assistant Examiner*—Willie Morris Worth
*Attorney, Agent, or Firm*—Lloyd L. Zickert

[57] ABSTRACT

A flag and paint marking device for marking a path on a ground surface with paint and/or flags to indicate the path of an underground line or pipe, which includes a paint marker for dispensing paint and a flag receptacle for receiving a supply of flags and a stabber or ground hole-forming device for defining a hole into which a flag may be inserted.

8 Claims, 1 Drawing Sheet

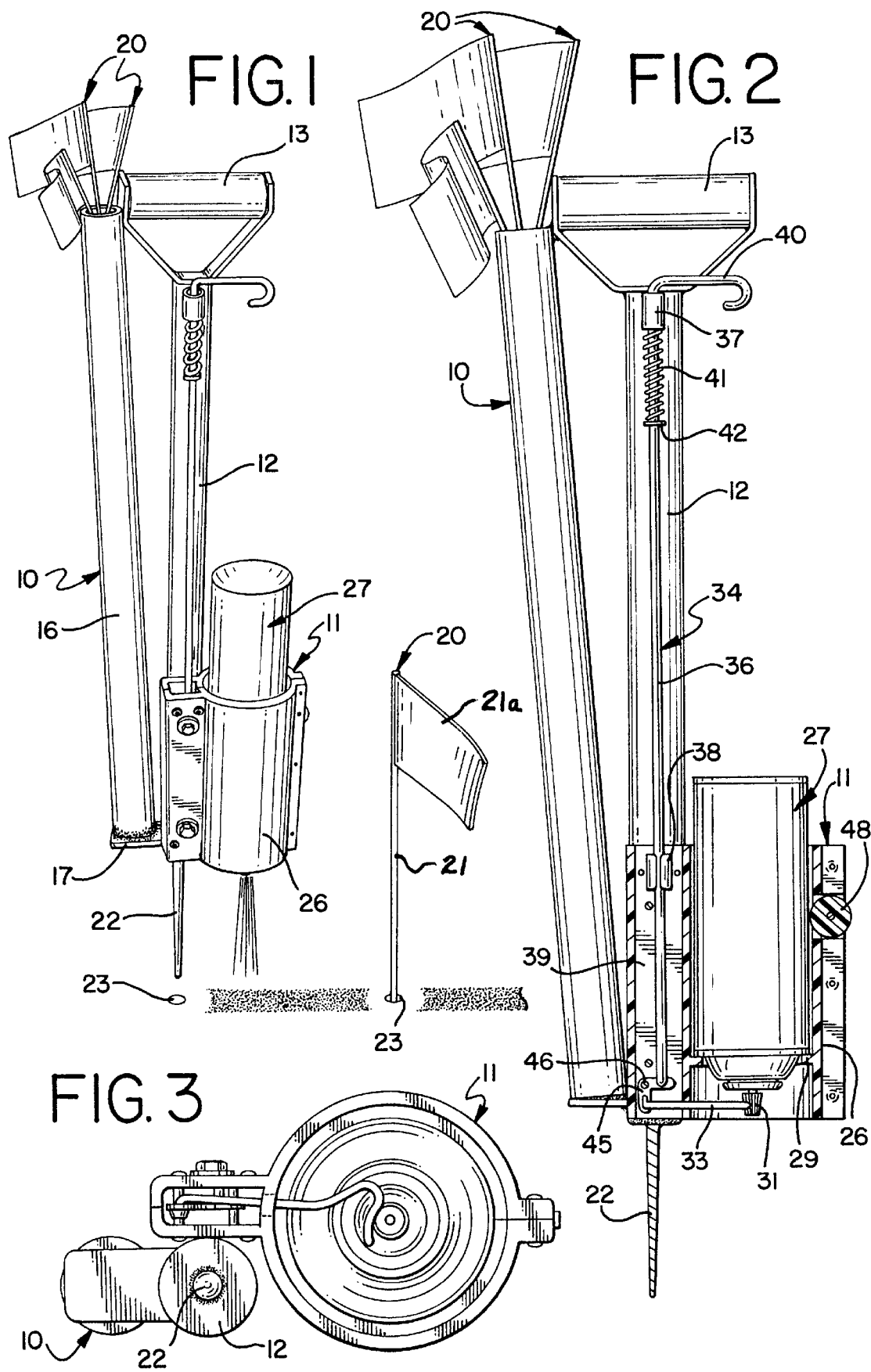

FLAG AND PAINT MARKING DEVICE

DESCRIPTION

This invention relates in general to a flag and paint marking device for marking above ground a path of underground lines or pipes, and more particularly to a flag and paint marker including a flag receptacle and a hole-forming device together with a device for selectively dispensing paint.

BACKGROUND OF THE INVENTION

It is common to bury underground utilities including electrical lines, telephone lines, cable lines, and gas lines or pipes. After a period of time, it becomes important to locate those underground utilities where additional underground devices or construction work may be planned to avoid damage of existing utilities. Such underground utilities are located with various devices including line and pipe locators, after which it is desired to mark the path along which the lines or pipes are buried. It is well known to use flags and paint to mark those paths.

In order to assist the worker in marking the paths, it is well known to provide a flag pouch and stabber for transporting flags to the marking site and placing them in the ground by first using the stabber to form a hole in the ground and then inserting the flag into the hole.

It has also been well known to spray paint along a path of underground utilities where the paint on the ground is readily visible together with the flags in order to mark the path of the underground utilities. In order to assist in using paint, it has been known to provide paint dispensers operable by the worker to intermittently spray paint on the ground.

The problem is that two different devices are needed to mark a path, one for flags and the other for paint. Thus, the marking procedure becomes cumbersome, particularly when it is desired to mark by flags and by paint for a path.

SUMMARY OF THE INVENTION

The marking problem above identified is overcome by the present invention wherein a single device is provided for the purpose of flag marking and paint marking. The device of the present invention includes a handle to which is attached a receptacle or pouch for flags and a stabber or hole-forming device that forms the hole in the ground into which a flag may be inserted. The marking device of the invention also includes a receptacle for receiving a can of spray paint and a device for actuating the can to dispense paint for marking the ground. Accordingly, a single device is provided for both marking a path of underground utilities with paint and with flags.

It is therefore an object of the present invention to provide a new and improved device for marking the path of underground utilities with flags and paint.

Another object of the present invention is to provide a combination flag and paint marking device which includes a receptacle for holding a plurality of flags and a stabber to form holes in the ground into which flags may be inserted together with a receptacle for holding a can of spray paint and a mechanism for actuating the can of spray paint to discharge paint at selective times.

Other objects, features and advantages of the invention will be apparent from the following detailed disclosure, taken in conjunction with the accompanying sheet of drawings, wherein like reference numerals refer to like parts.

DESCRIPTION OF THE DRAWINGS

FIG. 1 is a perspective view of the flag and paint marking device of the present invention and illustrating the operation of the device;

FIG. 2 is an enlarged side elevational view of the device of FIG. 1 with some parts shown in section to show underlying parts and particularly with respect to the paint marker of the device; and FIG. 3 is a bottom plan view of the flag and paint marker of FIG. 2.

DESCRIPTION OF THE INVENTION

Referring now to the drawings, the flag and paint marker of the present invention includes a flag marker 10 and a paint marker 11 attached to an elongated upstanding handle 12 having a hand-gripping member 13 at the upper end.

The flag marker 10 includes an elongated pouch or tubular receptacle 16 closed at its bottom end by a plate 17 that is suitably secured directly to the handle 12 as seen particularly in FIG. 3. The upper end of the receptacle 16 is open and into which a plurality of flags 20 may be inserted for storage until needed to be used. Each flag includes a pole or shaft 21, and a pennant or flag 21a. The flag marker further includes a stabber or hole-forming member 22 having a lower pointed end for defining a hole 23 in the ground upon downward driving of the device toward the ground. After a hole is formed by the hole-forming member 22, a flag can be inserted such as illustrated in FIG. 1. Normally, flags are inserted at spaced distances along a path of the underground utility being marked.

The paint marker 11 includes a paint can receptacle 26 that is tubular in form for receiving and holding a standard can of spray paint 27. As seen particularly in FIG. 2, an annular ledge or flange 29 is formed at the interior of the tubular receptacle 26 and sized to allow the neck of the can to extend below the ledge and the shoulder of the can to engage the ledge and particularly positioning and aligning the can so that the spray nozzle 31 of the can will be aligned with an actuating arm 33 of the paint can actuator 34.

The actuator 34 further includes an elongated rod 36 guidably held against the handle 12 by an upper sleeve 37 attached to the handle 12 and a lower sleeve 38 mounted within a channel 39 formed adjacent to the paint can receptacle 11. The upper end of the rod 36 is bent over to form a trigger 40 that may be engaged by the finger of the worker grasping the hand-gripping member 12. The rod is shown in the rest or home position, which position is maintained by a return spring 41 bottomed at one end on the sleeve 37 and at the other end on a retainer 42 suitably locked to the rod 36.

The lower end of the elongated rod 36 is bent at substantially right angles to engage in a hole formed in one leg of the crank arm 45 which is pivotally mounted on pivot 46 in the channel 39. The other leg of the crank arm receives the inner end of the actuating arm 33 whereby upward movement of the elongated rod 36 rotates the crank arm 45 to drive the actuating arm 33 inward against the spray can nozzle 31 in order to cause discharge of paint from the can of spray paint 27.

In order to assist in retaining the spray can in position within the receptacle, a roller 48 is rotationally mounted in the receptacle 11 to engage the outer surface of the can as it is inserted into he receptacle and maintain it in tight relation with the receptacle at all times. Thus, the roller 48 acts as a retainer or gripper coacting with the opposed inner wall of the receptacle for maintaining the can in the receptacle once it has been placed in the receptacle.

In operation a worker would grasp the hand-gripping member 13 of the handle 12 to transport the flag and paint marker to a location where it is to be used. There the worker would discharge paint along the path of an underground utility by actuating the can of spray paint by pulling the trigger 40 to spray paint on the ground. Additionally, when it is desired to plant a flag in the ground, the workman would form a hole in the ground with the stabber 22 and then withdraw a flag from the receptacle 16 and insert it into the ground hole. It will be appreciated that the device of the invention may also be used only to place flags in the ground to mark an underground utility path, or only use paint as a marker. It is apparent that only paint would be used to mark hard surfaces, such as concrete and the like. In view of the foregoing, it will be appreciated that a worker can more efficiently mark a path of an underground utility with paint and/or flags with the device of the present invention.

It will be understood that modifications and variations may be effected without departing from the scope of the novel concepts of the present invention, but it is understood that this application is to be limited only by the scope of the appended claims.

The invention is hereby claimed as follows:

1. A combination flag and paint marking device for marking a path on a ground surface with flags and/or paint, wherein each said flag includes a shaft and a flag element, said device comprising: a handle having an upper and lower end, a hand-gripping member on the upper end of the handle, a flag marker and a paint marker carried by the handle, said flag marker including a tubular flag receptacle having an open upper end adjacent said hand-gripping member, wherein said flag receptacle may receive the shafts of a plurality of flags, and means adjacent said lower end of said handle for penetrating the ground to form a hole for insertion of the shaft of a flag, said paint marker including a tubular receptacle for receiving a can of spray paint with a spray nozzle, and means adjacent said hand-gripping member for actuating said can in said receptacle to discharge paint.

2. The combination of claim 1, wherein the penetrating means includes a stabber.

3. The combination of claim 2, wherein the stabber includes a pointed rod.

4. The combination of claim 1, wherein said can receiving receptacle includes a positioning flange for aligning the spray nozzle with said actuating means.

5. The combination of claim 1, wherein said can receiving receptacle includes means to grippingly hold the can in the receptacle.

6. The combination of claim 2, wherein said can receiving receptacle includes means to grippingly hold the can in the receptacle.

7. The combination of claim 1, wherein said actuating means includes a trigger adjacent the hand-gripping member, and linkage means between the trigger and the nozzle for connecting the trigger and the nozzle such that the trigger can actuate said nozzle.

8. The combination of claim 7, wherein said actuating means further includes spring return means for returning the trigger to home position following actuation.

* * * * *